United States Patent [19]
Fujiki

[11] Patent Number: 5,447,061
[45] Date of Patent: Sep. 5, 1995

[54] MISFIRE DETECTION METHOD FOR ENGINE

[75] Inventor: Haruo Fujiki, Tokyo, Japan

[73] Assignee: Fuji Jukogyo Kabushiki Kaisha, Tokyo, Japan

[21] Appl. No.: 128,229

[22] Filed: Sep. 29, 1993

[30] Foreign Application Priority Data

Oct. 8, 1992 [JP] Japan ................... 4-270597
Oct. 8, 1992 [JP] Japan ................... 4-270598

[51] Int. Cl.$^6$ ......................... G01M 15/00
[52] U.S. Cl. ..................... 73/117.3; 364/431.07
[58] Field of Search ............ 73/116, 117.3, 117.2; 364/431.07, 431.08

[56] References Cited

U.S. PATENT DOCUMENTS

| | | | |
|---|---|---|---|
| 3,972,230 | 8/1976 | Hanson et al. ............ | 73/116 |
| 4,337,647 | 7/1982 | Radcliffe et al. .......... | 73/116 |
| 5,041,980 | 8/1991 | Maddock et al. .......... | 73/116 |
| 5,044,195 | 9/1991 | James et al. ............... | 73/117.3 |
| 5,237,862 | 8/1993 | Mangrulkar ............... | 73/116 |
| 5,245,866 | 9/1993 | Hashiguchi et al. ........ | 73/117.3 |
| 5,263,364 | 11/1993 | Nakayama et al. ........ | 73/116 |
| 5,263,365 | 11/1993 | Müller et al. .............. | 73/117.3 |

Primary Examiner—Richard E. Chilcot, Jr.
Assistant Examiner—George M. Dombroske
Attorney, Agent, or Firm—Beveridge, DeGrandi, Weilacher & Young

[57] ABSTRACT

The present invention relates to a method of accurately detecting misfiring in an engine that is not affected by fluctuations in engine speed caused by factors other than misfiring, and that is also accurate during continuous misfiring. The method identifies the start of misfiring in a cylinder n-1 if a compensated differential rotation DELNA falls in the negative direction to less than or equal to a misfire identification level LVLMIS in a transition from a cylinder n-2 to cylinder n-1, and this condition continues in the subsequent transition from cylinder n-1 to cylinder n. After misfiring has been identified, this method detects that misfiring continues by comparing a compensated differential rotation DELNAn-1 for cylinder n-1 with the sum of the misfire identification level LVLMIS and a minimum value DNEAMS. It identifies that the misfiring has ended when DELNAn-1≧DNEAMS+LVLMIS and the fall of the compensated differential rotation DELNAn-1 for cylinder n-1 has recovered to a prescribed level.

12 Claims, 16 Drawing Sheets

MISFIRE DETECTION METHOD FOR ENGINE

BACKGROUND OF THE INVENTION

The present invention relates to an engine misfire detection method that detects misfiring from the fluctuation of engine rotation.

PRIOR ART

In general, to achieve stable output in a multiple cylinder engine, combustion should ideally occur if air-fuel mixture is ignited at the same point in each cycle, but, since structural variations such as complications in the shape of the manifolds, unevenness in the intake air distribution ratio due to interference in the intake between cylinders, small differences in combustion temperature between cylinders caused by coolant paths, the volume of the combustion chamber of each cylinder, and piston shape can act together in a multiplicative manner, variations in combustion can easily occur in a multiple cylinder engine.

Up to now, these fluctuations in combustion between cylinders have been minimized by controlling the air-fuel ratio for each cylinder and controlling ignition timing. However, with recent high performance engines that tend to have higher output powers and practice fuel economy, if a component such as an injector or spark plug should deteriorate or a fault should occur, this could lead to the occurrence of intermittent or continuous misfire.

In general, whether or not a cylinder is in a misfire status can be detected by detecting a fluctuating component in the engine speed caused by misfiring, and comparing this fluctuating engine speed component with a prescribed identification level. For example, Japanese Patent Laid Open No. 1987-118031 discloses a technique of measuring the spacing of a plurality of pulse signals generated once every rotation of the crank shaft, identifying the maximum value of the fluctuations in engine speed from timing changes in the pulse spacing, and identifying which cylinder is subject to abnormal combustion, based on a value calculated from this maximum value and the pulse signals.

Japanese Patent Laid Open No. 1990-112646 discloses a technique of detecting a plurality of angular positions through one revolution of a multiple cylinder internal combustion engine, detecting the instantaneous engine speed of a specific rotational position of each cylinder from the detected angular positional spacing, then detecting abnormal cylinders from a fluctuating component of this instantaneous engine speed.

However, continuous rotation fluctuations can be generated in an engine by factors other than misfiring, such as acceleration, and, once misfiring has occurred, it often occur continuously between cylinders. In such a case, there is a fear that identifying misfire by simply comparing the fluctuating rotation component with a misfire identification level could lead to mistaken identification of misfiring if continuous rotation fluctuations are caused by something other than misfiring, or conversely, continuous misfiring could be mistakenly identified as simply being continuing rotation fluctuation.

SUMMARY OF THE INVENTION

The present invention has been devised with the aim of solving the above described problems and has as its objective the provision of a misfire detection method that is not affected by fluctuations in engine rotation caused by factors other than misfiring, and that can accurately detect misfiring even if such misfiring occurs continuously.

The misfire detection method of the present invention is characterized in that it obtains a difference in engine speed obtained between two cylinders that are consecutive in the combustion sequence, and it identifies a continuous misfiring status as being a period after the difference in engine speed has changed beyond the width of a misfire identification level that has been set based on the operating status of the engine and has fallen below a negative value that is less than the misfire identification level, until it rises to a prescribed level.

With the misfire detection method for an engine in accordance with the present invention, a continuous misfiring status is identified as being a period after a difference in engine speed between the two cylinders that are consecutive in the combustion sequence has changed beyond the width of a misfire identification level and has fallen below a negative value that is less than the misfire identification level, until it rises to a prescribed level.

The misfire identification method of the present invention concerns a method of detecting misfiring which uses a difference in engine speed between two cylinders that are consecutive in the combustion sequence, and which is characterized in setting an identification level for identifying engine rotation fluctuations due to an external disturbance, based on the engine's operating status, and, if the difference in engine speed-has risen to greater than or equal to an identification level, in halting misfiring detection until a prescribed period of time has expired after the difference in engine speed has intersected the identification level in the downward direction.

When the misfire identification method of the present invention has detected that large engine rotation fluctuations have occurred, by determining that a difference in engine speed between two cylinders that are consecutive in the combustion sequence has risen above an identification level for identifying engine rotation fluctuations due to an external disturbance and, in order to wait for the engine rotation fluctuations to settle down, it halts a diagnosis procedure intended to detect misfiring until a prescribed period of time has expired after the difference in engine speed has intersected the identification level in the downward direction.

DETAILED DESCRIPTION OF THE PREFERRED EMBODIMENT

Figure 1:
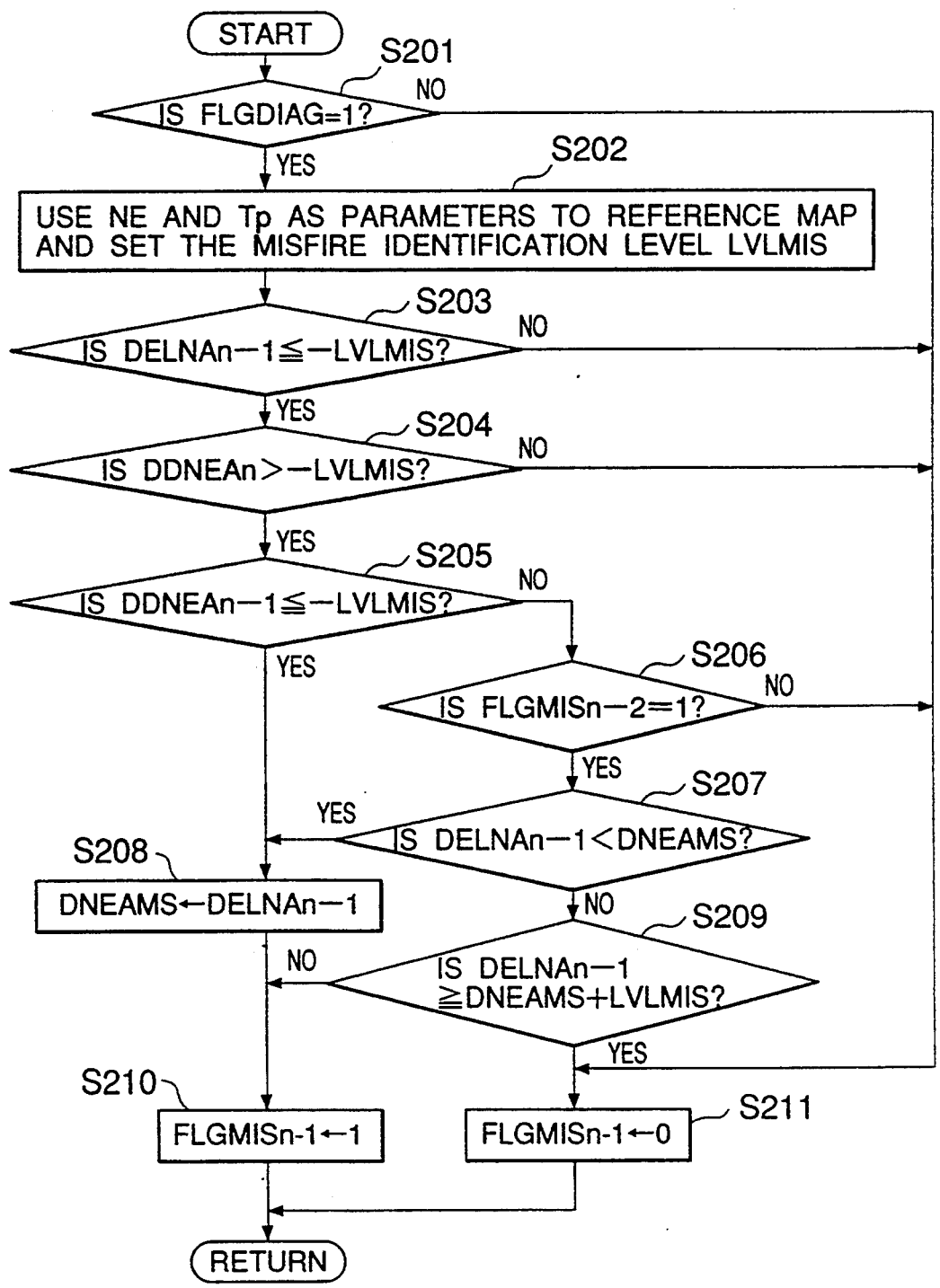
FIG. 1 is a flowchart of a continuous misfire diagnosis subroutine, in accordance with the present invention.
Figure 2:
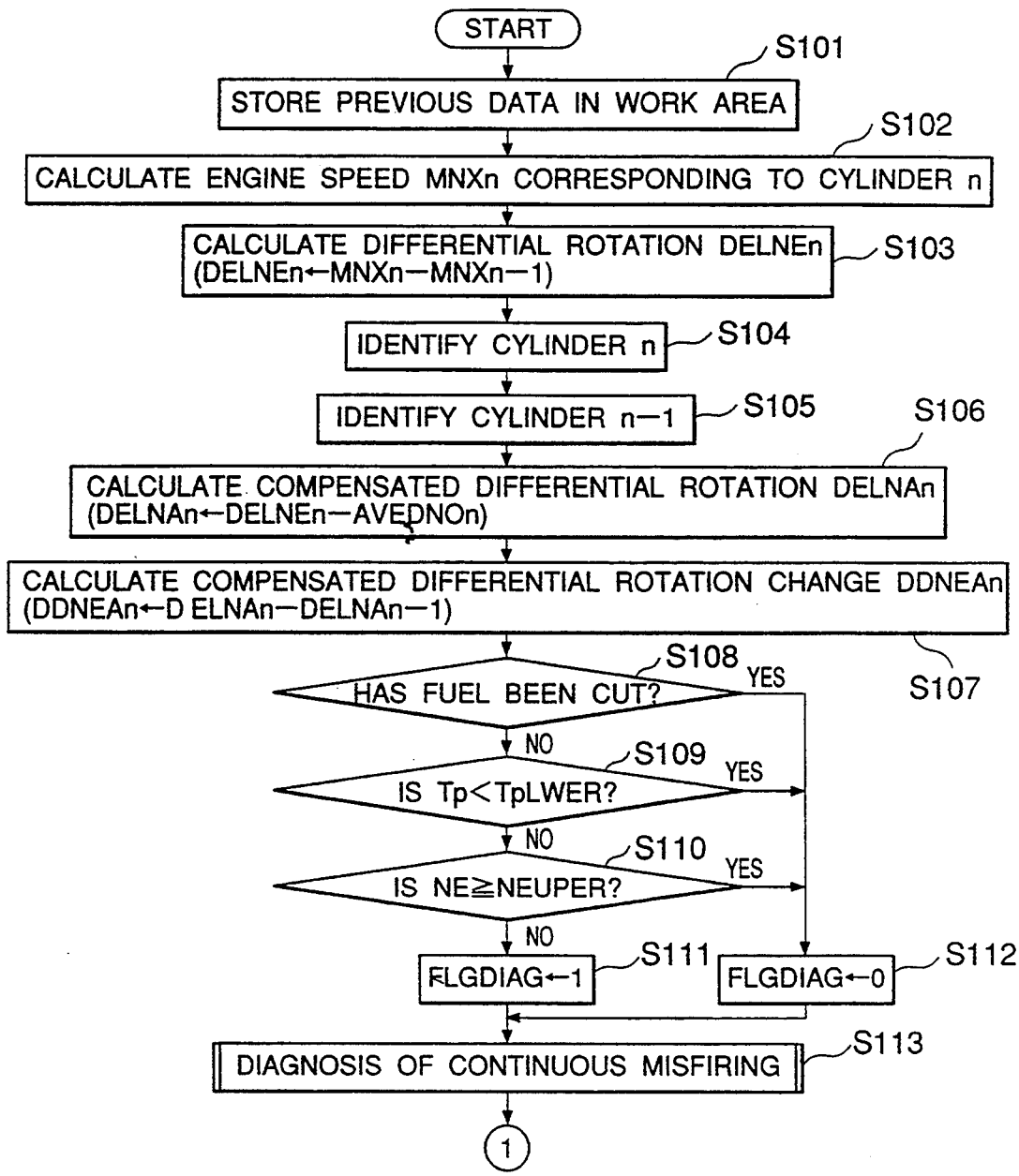
FIG. 2 is the first part of a flowchart of a misfire diagnosis routine.
Figure 3:
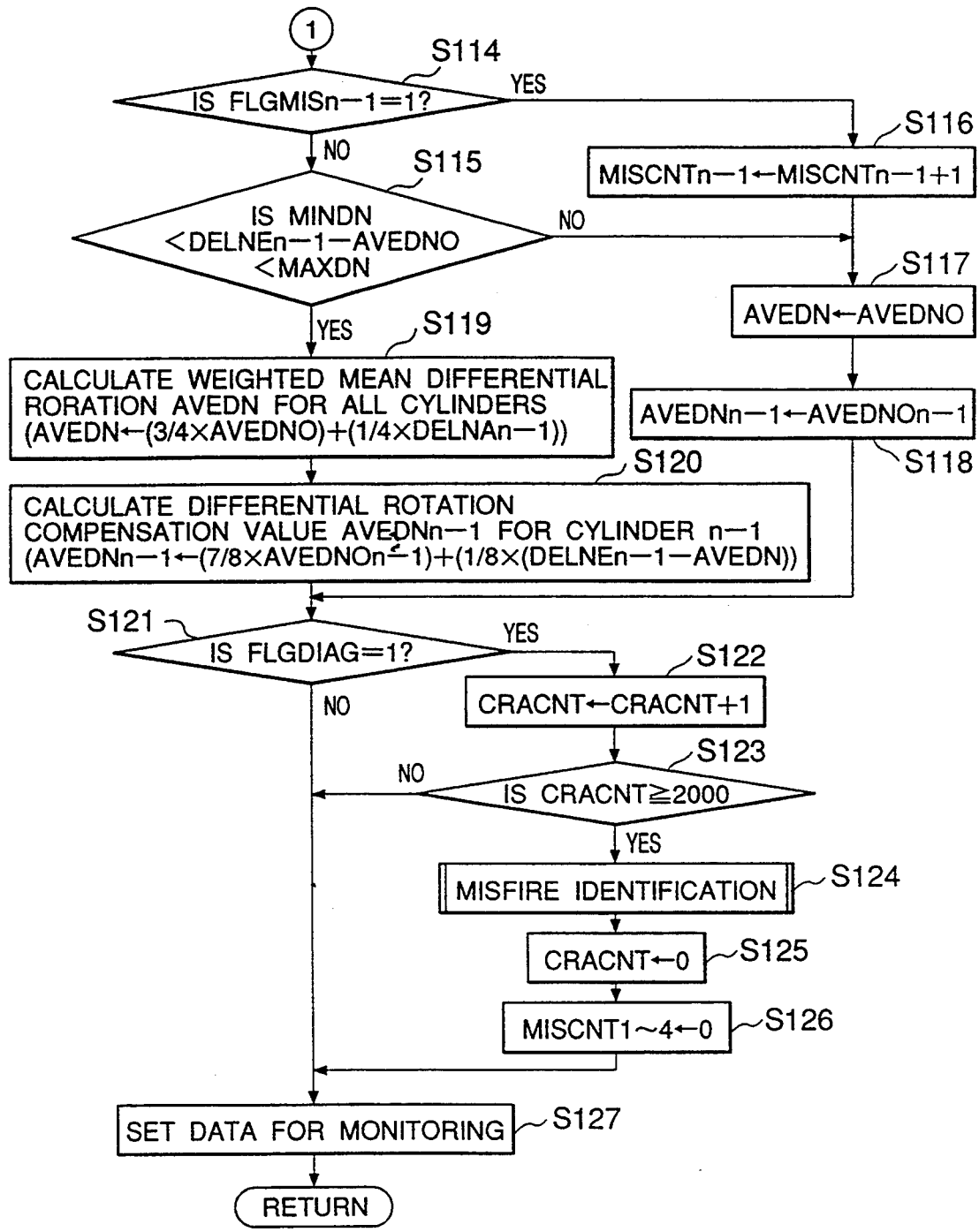
FIG. 3 is the second part of the flowchart of a misfire diagnosis routine shown in FIG. 2.
Figure 4:
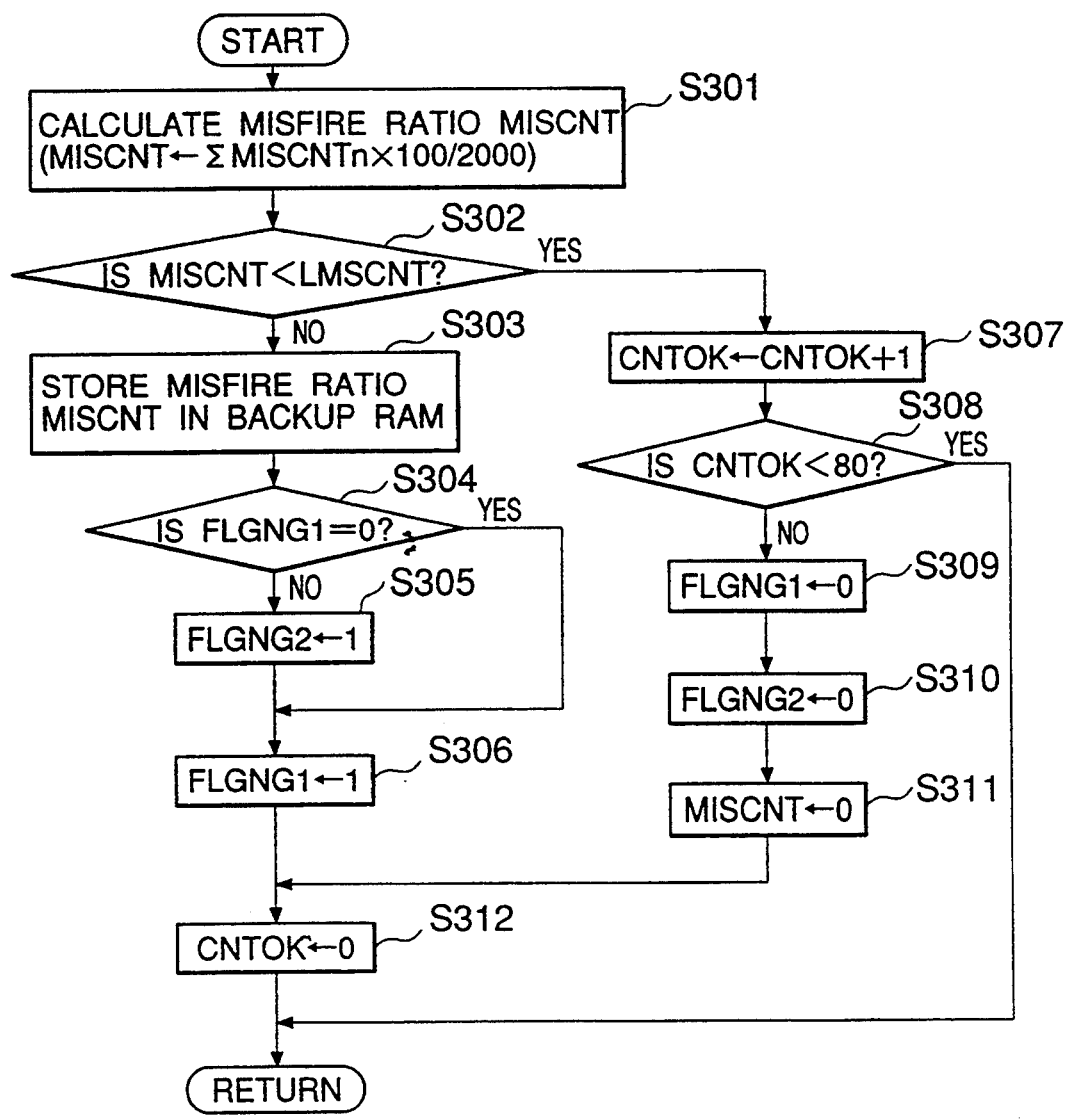
FIG. 4 is a flowchart of a misfire identification subroutine.
Figure 7:
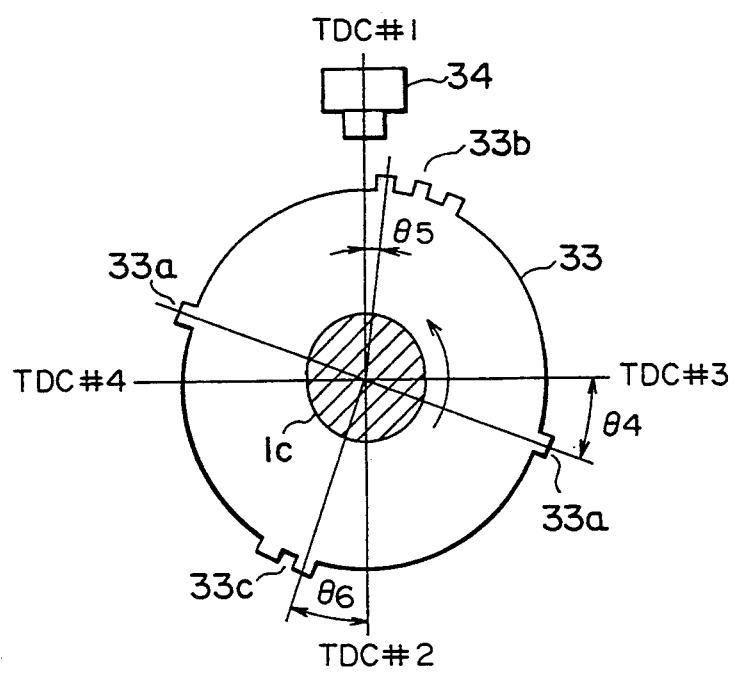
FIG. 7 is a front elevation of a cam rotor and a cam angle sensor.
Figure 8:
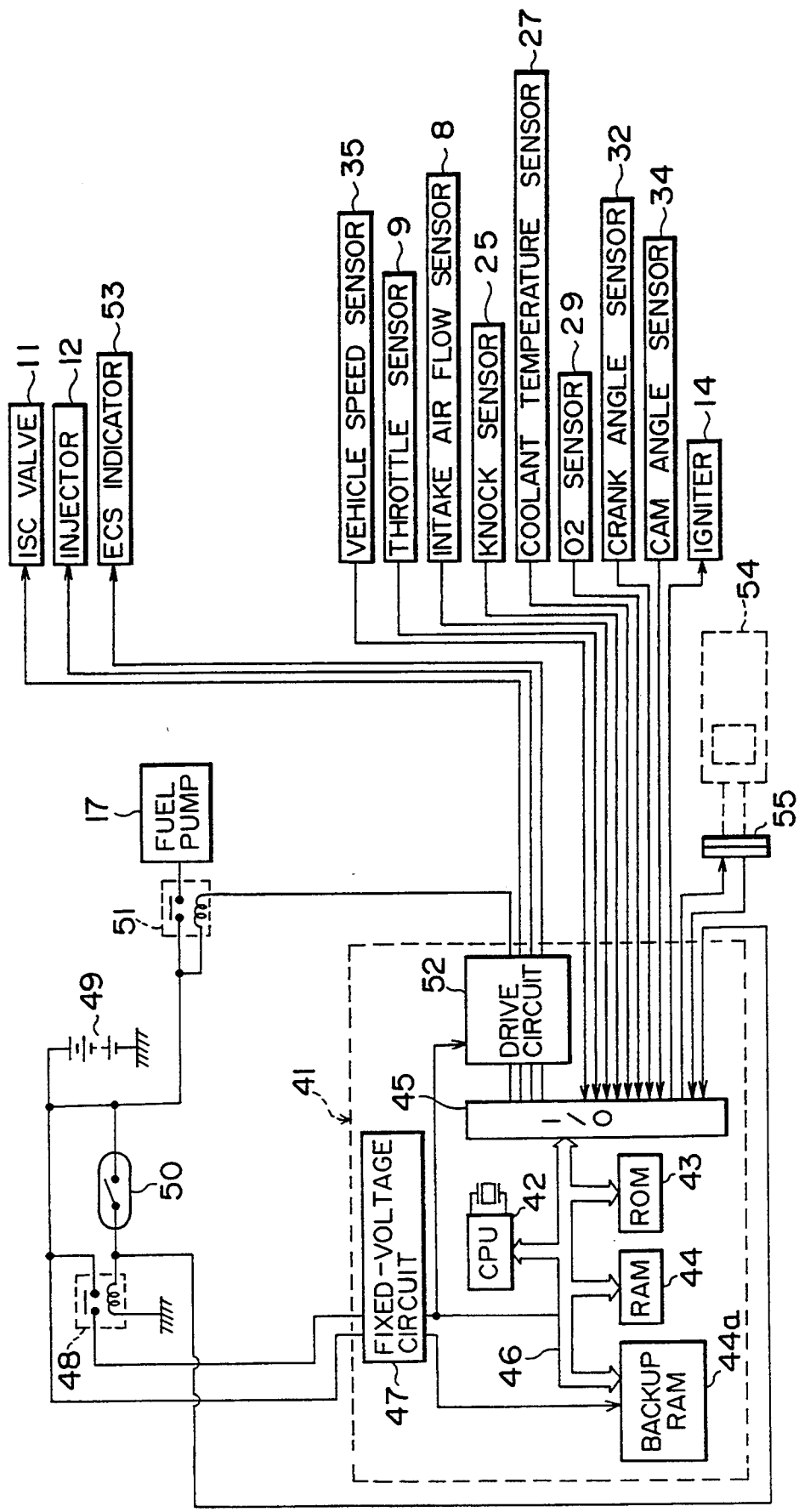
FIG. 8 is a circuit diagram of an electronic control system.
Figure 9:
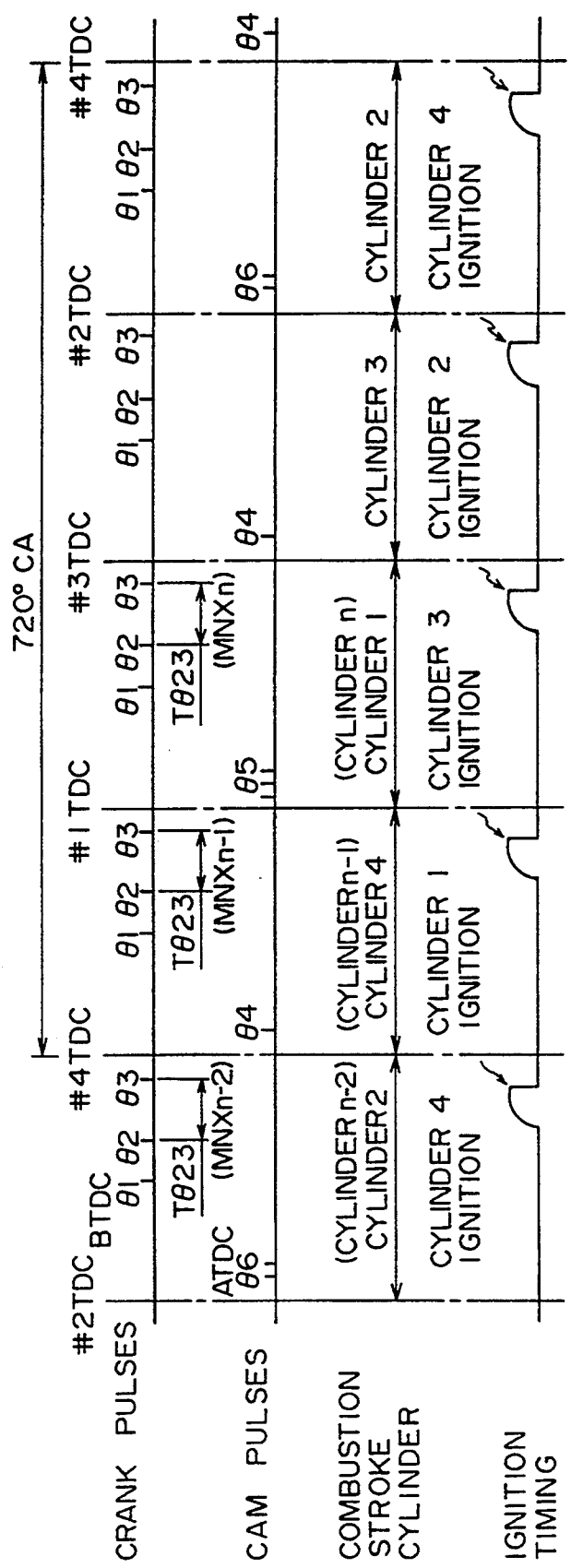
FIG. 9 is a timing chart showing the various relationships between crank pulses, cam pulses, combustion stroke cylinder, and ignition timing.
Figure 10:
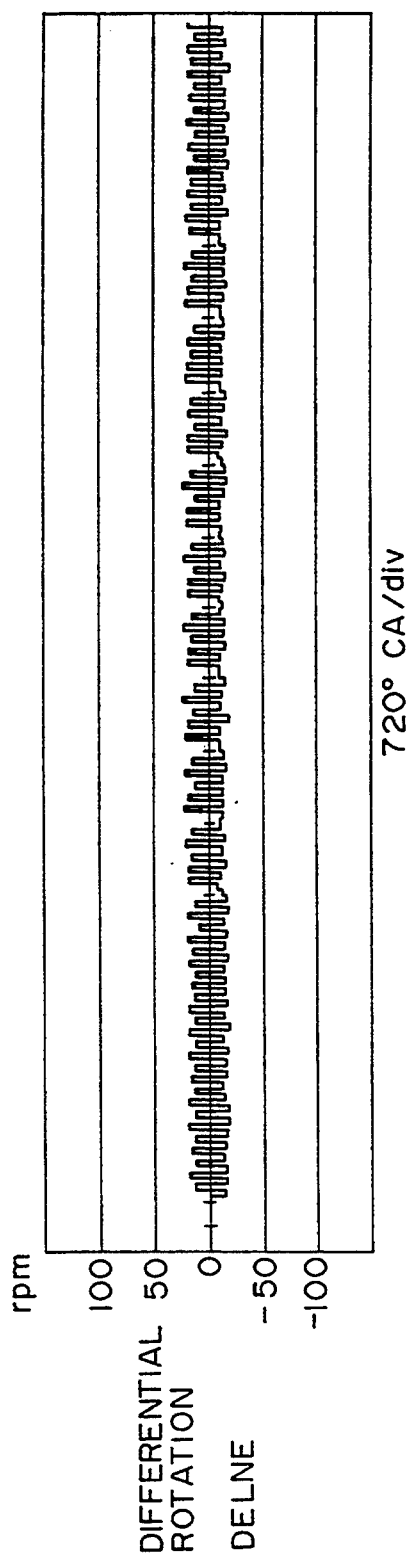
FIG. 10 is a diagram illustrating differential rotation before compensation.
Figure 11:
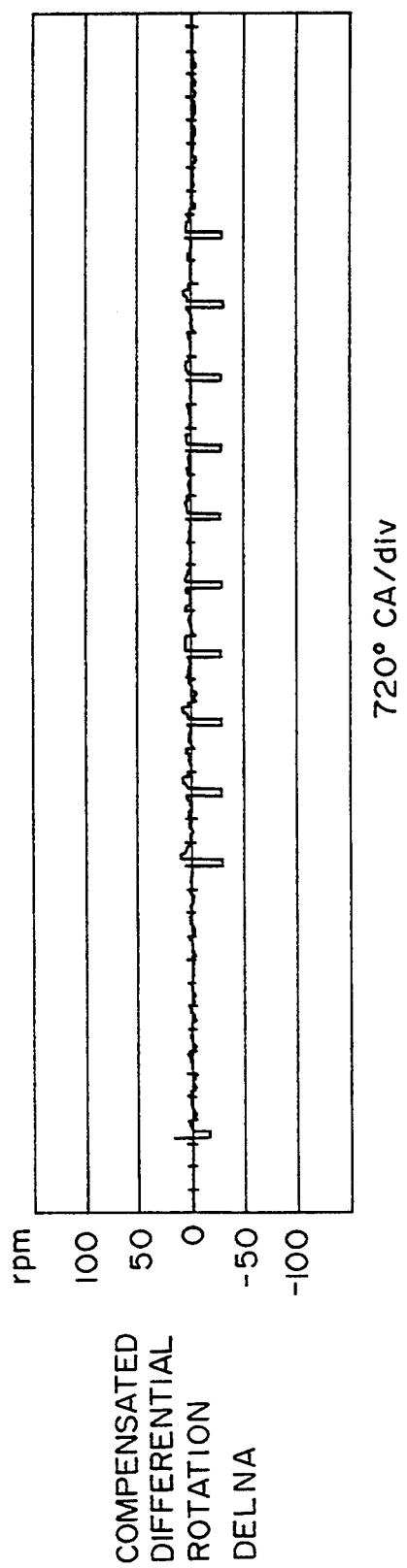
FIG. 11 is a diagram illustrating differential rotation after compensation.
Figure 12:
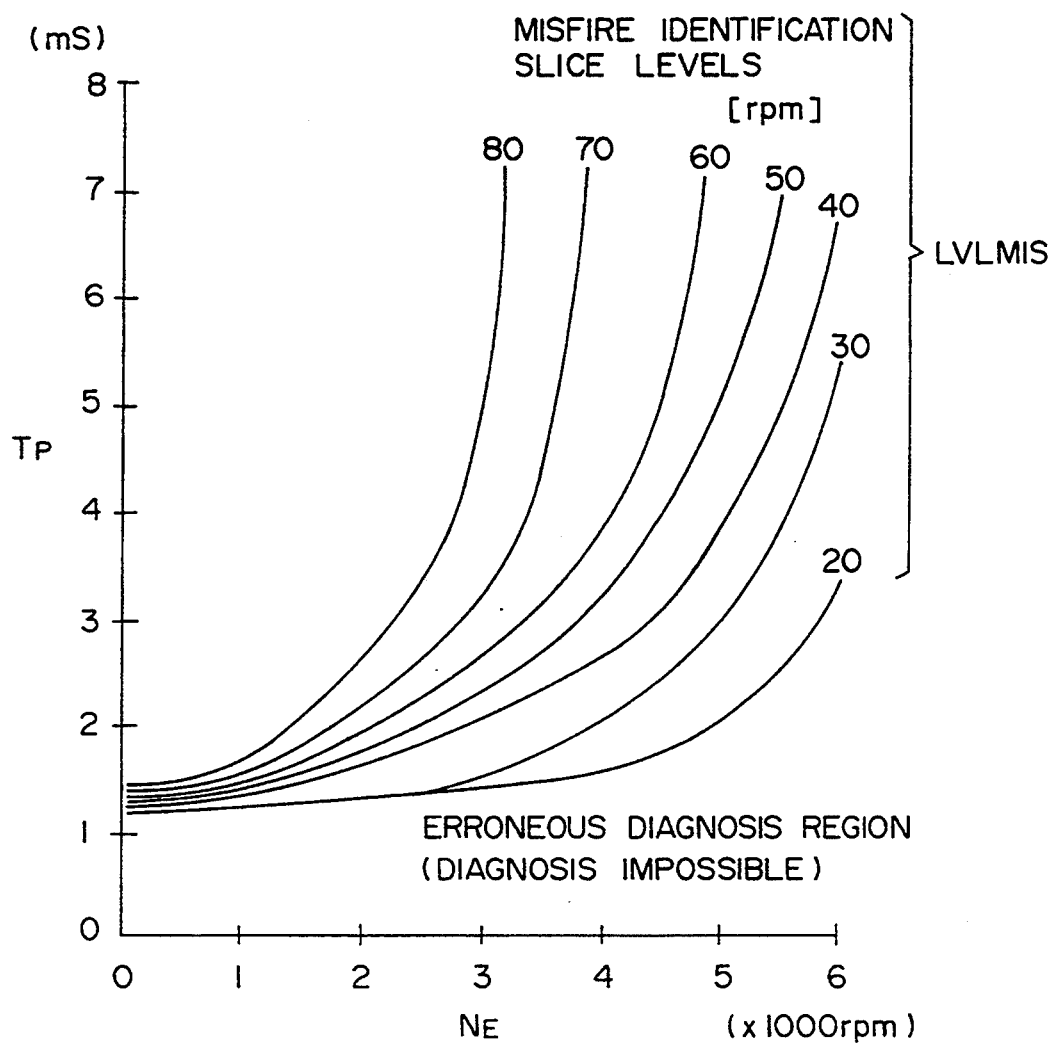
FIG. 12 is a graph of misfire identification levels.
Figure 13:
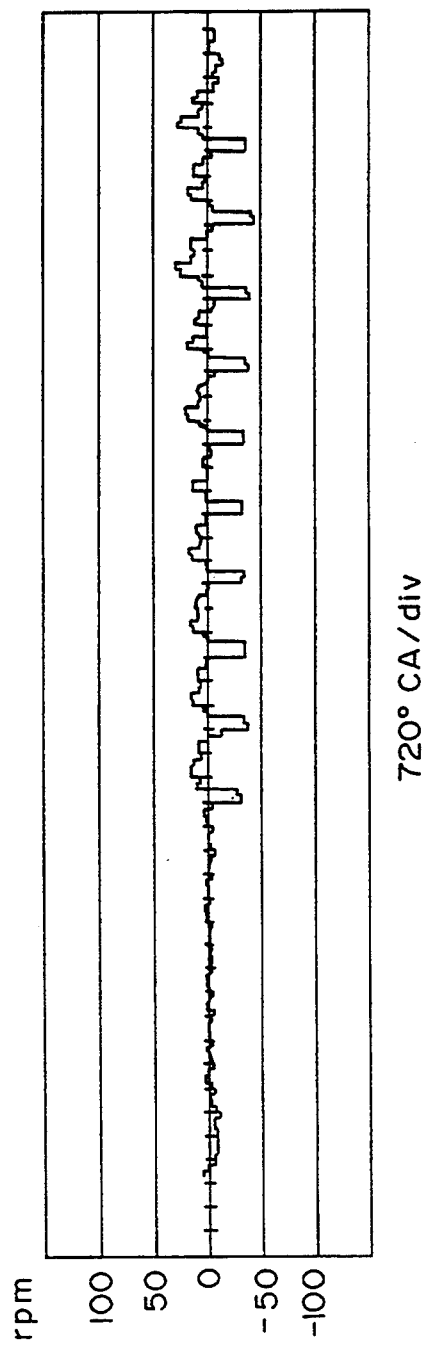
FIG. 13 is a diagram illustrating differential rotation while continuous misfiring is occurring.

An embodiment of the present invention will be described below with reference to the accompanying figures. These figures illustrate one embodiment of the present invention, wherein a flowchart of a continuous misfire diagnosis subroutine is shown in FIG. 1; the first part of a flowchart of a misfire diagnosis routine is shown in FIG. 2; the second part of the flowchart of the misfire diagnosis routine is shown in FIG. 3; a flowchart of a misfire identification subroutine is shown in FIG. 4; an abbreviated structural diagram of an engine control system is shown in FIG. 5; a front elevation of a crank rotor and a crank angle sensor is shown in FIG.. 6; a front elevation of a cam rotor and a cam angle sensor is shown in FIG. 7; a circuit diagram of an electronic control system is shown in FIG. 8; a timing chart showing the various relationships between crank pulses, cam pulses, combustion stroke cylinder, and ignition timing is shown in FIG. 9; a diagram illustrating differential rotation before compensation is shown in FIG. 10; a diagram illustrating differential rotation after compensation is shown in FIG. 11; a graph of misfire identification levels is shown in FIG. 12; and a diagram illustrating differential rotation while continuous misfiring is occurring is shown in FIG. 13.

Figure 5:
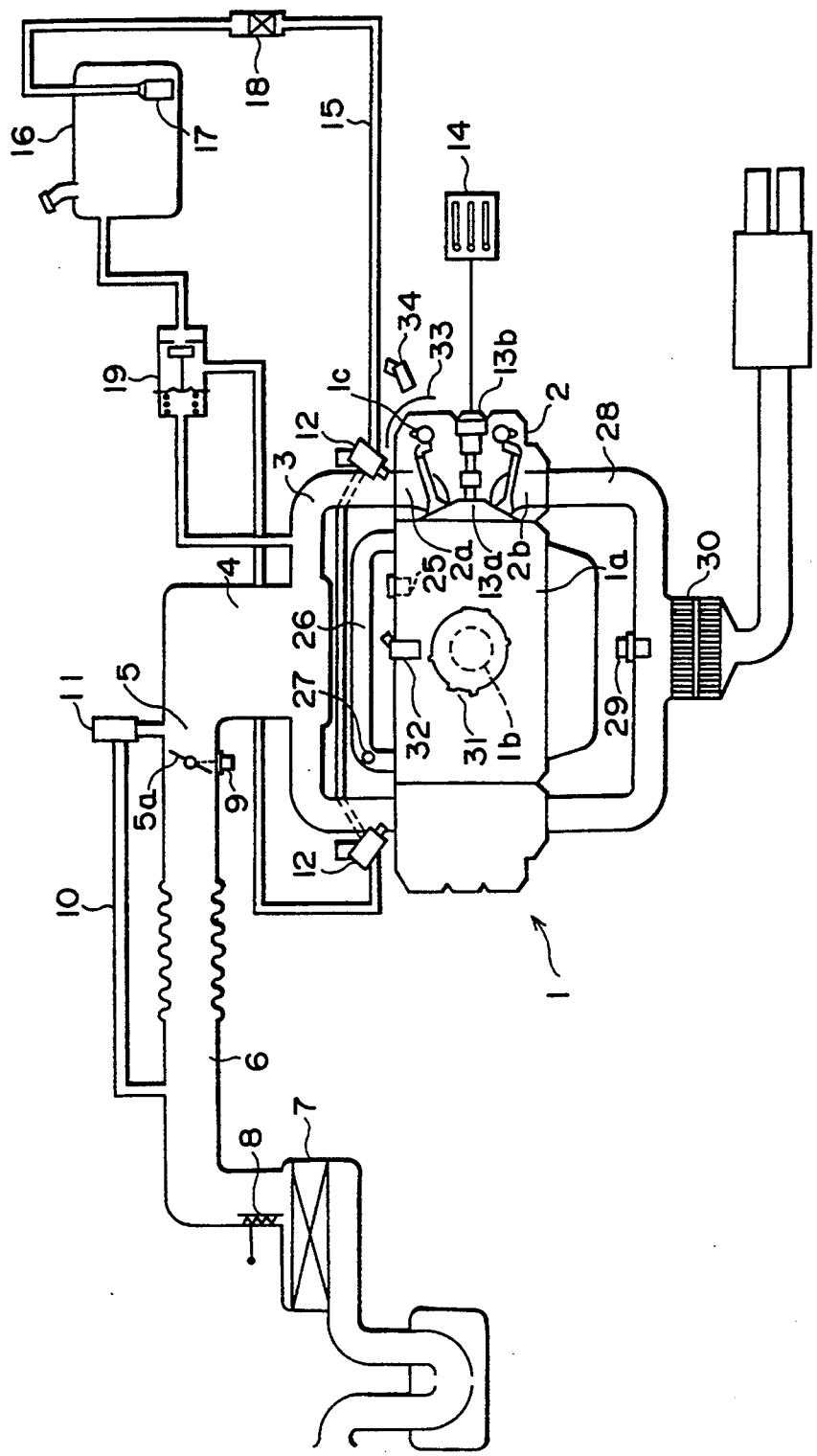
FIG. 5 is an abbreviated structural diagram of an engine control system.

In FIG. 5, reference number 1 denotes an engine which, in this figure, is a horizontally aligned four-cylinder engine. An intake manifold 3 communicates with each of a number of intake ports 2a that are formed in a cylinder head 2 of the engine 1, a throttle chamber 5 communicates with the intake manifold 3 through an air chamber 4, and an air cleaner is mounted on the upstream side of the throttle chamber 5 with an intake pipe 6 therebetween.

An intake air flow sensor 8 (which, in this figure, is a hot-wire type of intake air flow sensor) is inserted directly downstream of the air cleaner 7 of the intake pipe 6, and a throttle sensor 9 is provided linked to a throttle valve 5a provided in the throttle chamber 5.

An idle speed control (ISC) valve 11 is inserted partway along a bypass passage 10 that communicates between the upstream and downstream sides of the throttle valve 5a, and an injector 12 faces into the directly upstream side of the intake ports 2a of the intake manifold 3.

A spark plug 13a with an end that faces into a combustion chamber is mounted in each of the cylinders of the cylinder head 2, and an igniter 14 is connected to an ignition coil 13b that is linked to the spark plug 13a.

The injector 12 communicates with a fuel tank 16 through a fuel supply line 15 and an in-tank type of fuel pump 17 is provided in the fuel tank 16. Fuel from the fuel pump 17 is supplied in a pressure regulator 19 under pressure. And the fuel is injected into the intake port 2a from the injector 12 through a fuel filter 18 mounted in the fuel supply line 15, and returns from the pressure regulator 19 to the fuel tank 16 to maintain the pressure therein at a prescribed value.

A knock sensor 25 is installed in a cylinder block 1a of the engine 1 and a coolant temperature sensor 27 faces into a coolant water passageway 26 communicating with left and right banks of the cylinder block 1a. In addition, an $O_2$ sensor 29 faces into a collective portion of an exhaust manifold 28 that communicates with exhaust ports 2b of the cylinder head 2. Reference number 30 denotes a catalytic converter.

A crank rotor 31 is mounted so as to be free to rotate on the axis of a crank shaft 1b that is removably supported in the cylinder block 1a, and a crank angle sensor 32 comprising a sensor such as an optical sensor or a magnetic sensor that is a magnetic pickup is provided facing the outer periphery of the crank motor 31, to form a rotation detection means that detects the rotation of the engine. A cam rotor 33 is mounted in linkage with a cam shaft 1c of the cylinder head 2, and a cam angle sensor 34 comprising a sensor such as an optical sensor or a magnetic sensor that is a magnetic pickup is provided facing the outer periphery of the cam rotor 33, to identify the cylinders.

Figure 6:
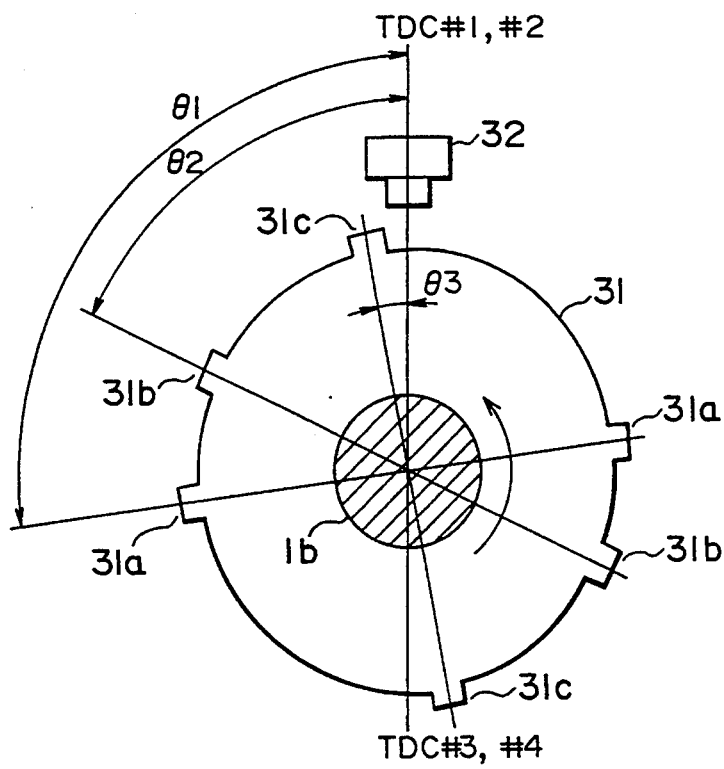
FIG. 6 is a front elevation of a crank rotor and a crank angle sensor.

Protrusions (or they could be slots) 31a, 31b, and 1c are formed around the outer periphery of the crank rotor 31, as shown in FIG. 6. The protrusions 31a, 31b, and 31c are formed at angular positions $\theta 1$, $\theta 2$, and $\theta 3$ before top dead center (BTDC) of each of the cylinders, and detection signals that are output from the crank angle sensor 32 in correspondence with the protrusions 31a, 31b, and 31c have their waveforms shaped and are input to an electronic control unit (ECU) 41 as $\theta 1$, $\theta 2$, and $\theta 3$ crank pulses. Thus not only can the speed of the engine be calculated, but also timing for ignition timing control and fuel injection control can be obtained.

Cylinder identification protrusions (or they could be slots) 33a, 33b, and 33c are formed around the outer periphery of the cam rotor 33, as shown in FIG. 7. The protrusion 33a is formed at a position $\theta 4$ after top dead center (ATDC) of cylinders 3 and 4. The protrusion 33b is actually configured as a train of three protrusions, the first of which being formed at a position $\theta 5$ after top dead center (ATDC) of cylinder 1. The protrusion 33c is configured as a train of two protrusions, the first of which being formed at a position $\theta 6$ after top dead center (ATDC) of cylinder 2.

The protrusions 33a, 33b, and 33c of the cam rotor 33 are detected by the cam angle sensor 34, and the resultant waveform is shaped and then input to the ECU 41 as $\theta 4$, $\theta 5$, and $\theta 6$ cam pulses for cylinder identification.

With the above configuration, cam pulses are generated at positions superimposed on crank pulses as the engine operates, as shown in FIG. 9, and each cylinder can be identified from the numbers of these cam pulses and their generation status.

Note that, in the embodiment shown in these figures, $\theta 1 = 97°CA$, $\theta 2 = 65°CA$, $\theta 3 = 10°CA$, $\theta 4 = 20°CA$, $\theta 5 = 5°CA$, and $\theta 6 = 20°CA$.

A reference number 41 in FIG. 8 denotes an electronic control unit (ECU) such as a microcontroller in which a CPU 42, a ROM 43, a RAM 44, a backup RAM 44a, and an I/O interface 45 are mutually connected by a bus line 46, and which is supplied a prescribed stabilized voltage from a fixed-voltage circuit 47.

The fixed-voltage circuit 47 is connected to a battery 49 by relay connections of an ECU relay 48 and it is also connected directly to the battery 49. Therefore, when an ignition switch 50 connected between a relay coil of the ECU relay 48 and the battery 49 is turned on and the relay connections of the ECU relay 48 are closed, power for control is supplied to all the parts of the ECU. When the ignition switch 50 is turned off, backup power is supplied to the backup RAM 44a.

The battery 49 is also connected to a relay coil of a fuel pump relay 51 and to the fuel pump 17 through the relay connections of the fuel pump relay 51.

Various sensors such as the intake air flow sensor 8, the throttle sensor 9, the knock sensor 25, the coolant temperature sensor 27, the $O_2$ sensor 29, the crank angle sensor 32, the cam angle sensor 34, and a vehicle speed sensor 35 are connected to input ports of the I/O interface 45, and the battery 49 is also connected to enable monitoring of the battery voltage.

The igniter 14 is connected to an output port of the I/O interface 45, and the ISC valve 11, injector 12, the relay coil of the fuel pump relay 51, and an electronic control system (ECS) indicator 53 provided in an instrument panel (not shown in the figures) are also connected to output ports of the I/O interface 45 through a drive circuit 52.

A control program and various items of fixed control data are permanently stored in the ROM 43, and output signals from the various sensors and switches after data processing, as well as calculated data from the CPU 42, are temporarily stored in the RAM 44. Power is always supplied to the backup RAM 44a, regardless of the position of the ignition switch 50, so that even when the ignition switch 50 is off and the engine's operation is halted, the contents of the backup RAM 44a are not erased and thus its various contents such as error codes corresponding to problems detected by a self-diagnosis function can be stored therein.

Note that these error codes can be read out to an external device by connecting a serial monitor 54 to the ECU 41 by a connector 55. The serial monitor 54 is described in Japanese Patent Laid Open No. 1990-73131, a previous application by the present applicant.

The CPU 42 calculates quantities such as fuel injection amount, ignition timing, and the duty ratio of a drive signal for the ISC valve 11 in accordance with the control program stored in the ROM 43, to provide various types of control such fuel-air ratio control, ignition timing control, and idle engine speed control, and it also identifies misfiring in all of the cylinders n (where n=1 to 4).

The procedure of detecting misfiring, as performed by the ECU 41, will now be described below, with reference to the flowcharts of FIG. 1 to FIG. 4.

The flowchart of FIG. 2 and FIG. 3 shows a misfire diagnosis routine which is executed at an interrupt that is synchronized with the $\theta 3$ crank pulses from the crank angle sensor 32. First of all, a step S101 stores various items of data obtained by the previous execution of this routine in a work area. A step S102 calculates an engine speed MNXn corresponding to a cylinder n (where n=1, 3, 2, or 4 in sequence) from an input spacing timing $T\theta 23$ between the crank pulses $\theta 2$ and $\theta 3$ and from an included angle ($\theta 2 - \theta 3$) of the crank rotor 31, to consider misfiring in an engine low-speed region such as 150 rpm or above.

Note that, in the description below, the suffixes n, n-1, n-2, etc., of the parameters and flags refer to cylinder numbers.

Next, the flow proceeds to a step S103 which calculates the difference between the engine speed MNXn corresponding to cylinder n (calculated in step S102) and the engine speed MNXn-1 corresponding to cylinder n-1 which was the previously fired cylinder (the result calculated by the previous execution of this routine), to give a differential rotation DELNEn corresponding to cylinder n (i.e., DELNEn←MNXn−MNXn-1).

A step S104 identifies cylinder n (where n=1, 3, 2, or 4) fired this time, based on crank pulses output from the crank angle sensor 32 and cam pulses output from the cam angle sensor 34, and a step S105 identifies cylinder n-1 that fired previously.

For example, when crank pulses are input from the crank angle sensor 32 after the $\theta 5$ cam pulse train is input from cam angle sensor 34, it can be determined that those crank pulses are a signal indicating the crank angle of cylinder 3, as shown in FIG. 9. Similarly, if the $\theta 4$ cam pulse has been input after the $\theta 5$ cam pulse train, the subsequent crank pulses can be determined to be those indicating the crank angle of cylinder 2.

In the same way, the crank pulses after the $\theta 6$ cam pulse train is input are those indicating the crank angle for cylinder 4. If the $\theta 4$ cam pulse has been input after the $\theta 6$ cam pulse train, it can be determined that the subsequent crank pulses are those indicating the crank angle for cylinder 1.

Further, after cam pulses have been input from the cam angle sensor 34, the next crank pulse input from the crank angle sensor 32 can be determined to be that indicating the reference crank angle ($\theta 1$) of the corresponding cylinder.

In this embodiment of the present invention, the firing sequence is cylinder 1, cylinder 3, cylinder 2, then cylinder 4. Therefore, if, for example, the misfire diagnosis routine is executed in synchronization with the $\theta 3$ crank pulse at BTDC $\theta 3$ for cylinder 3, the combustion stroke cylinder n is cylinder 1, the previous combustion stroke cylinder n-1 is cylinder 4, and the combustion stroke cylinder n-2 before that is cylinder 2.

In this case, the position at which the crank angle is detected by the crank angle sensor 32 is affected by permissible structural errors in the positions and shapes of the protrusions 31a, 31b, and 31c of the crank rotor 31, as well as permissible errors in the mounting position within the engine 1 of the crank angle sensor 32, which are specific to that engine.

Consequently, variations due to these errors will be included in the value of the differential rotation DELNE calculated based on the crank pulses from the crank angle sensor 32. In particular, when the engine speed is high, this effect will give the apparent result that large uniform engine speed changes are generated, as can be seen from FIG. 10.

Therefore, as the procedure goes from step S105 to step S106, a compensated differential rotation DELNAn is calculated by subtracting from the differential rotation DELNEn calculated in step S103 a differential rotation compensation value AVEDNOn for cylinder n up until the previous execution, obtained by statistical processing on this differential rotation DELNEn (i.e., DELNAn←DELNEn −AVEDNOn).

This ensures that the correct differential rotation between cylinder n and cylinder n-1 (in other words, the compensated differential rotation DELNAn) can be obtained from the pre-compensation differential rotation DELNEn (into which are mixed fluctuations in rotation due to misfiring as well as apparent fluctuations due to permissible structural errors in the positions and shapes of the protrusions 31a, 31b, and 31c of the crank rotor 31 and permissible mounting errors of the crank angle sensor 32 on the engine 1, as shown in FIG. 10), and thus the fluctuations in rotation due to misfiring can be accurately extracted, as shown in FIG. 11.

Note that one tick along the vertical axis in each of FIG. 10, FIG. 11, and FIG. 13 (to be described later) represents an engine speed of 50 rpm, and one tick (1 div) along the horizontal axis represents 720°CA, and the differential rotation data calculated by the ECU 41 are expressed as the above described figures.

As described above, if, for example, the misfire diagnosis routine is executed in synchronization with the BTDC $\theta 3$ crank pulse of cylinder 3, the cylinder that is subjected to the present misfire diagnosis is cylinder 4 as cylinder n-1 that was the cylinder that was previously undergoing the combustion stroke. The misfire diagnosis of subsequent processing is performed on that cylinder 4 (cylinder n-1), from the change status of the compensated differential rotation DELNA4 (=DELNAn-1) for cylinder 4 and the compensated differential rotation DELNA1 (=DELNAn) for cylinder 1. The compensated differential rotation DELNA4 (=DELNAn-1) for cylinder 4 is obtained by the current execution of the routine by statistical processing after subtracting the engine speed MNX2 (=MNXn-2) for cylinder 2 (the cylinder that was in the combustion stroke before the previous one), based on the input spacing timing between the BTDC $\theta 2$ and $\theta 3$ crank pulses of cylinder 4, from the engine speed MNX4 (=MNXn-1) for cylinder 4 (the cylinder that was in the combustion stroke previously), calculated based on the input spacing timing between the BTDC $\theta 2$ and $\theta 3$ crank pulses of cylinder 1. The compensated differential rotation DELNA1 (=DELNAn) for cylinder 1 is obtained by the previous execution of the routine by statistical processing after subtracting the engine speed MNX4 (=MNXn-1), based on the input spacing timing between the BTDC $\theta 2$ and $\theta 3$ crank pulses of cylinder 1, from the engine speed MNX1 (=MNXn), based on the input spacing timing between the BTDC $\theta 2$ and $\theta 3$ crank pulses of cylinder 3.

Next, the flow proceeds from step S106 to a step S107 which calculates a compensated differential rotation change DDNEAn from the difference between the compensated differential rotation DELNAn for cylinder n and the compensated differential rotation DELNAn-1 for cylinder n-1 calculated by the previous execution of the routine (i.e., DDNEAn+DELNAn−-DELNAn-1). In other words, comparatively small fluctuations in engine speed generated by factors other than misfiring can be excluded by extracting the change in the compensated differential rotation DELNA, and thus accurate misfire detection is enabled.

The flow then proceeds from step S107 to steps S108, S109, and S110 which determine whether or not misfire diagnosis conditions set in each of steps S108, S109, and S110 are true. In other words, step S108 checks whether or not the fuel has been cut, step S109 checks whether or not a basic fuel injection pulse width Tp is less than a set value TpLWER, and step S110 checks whether or not the engine speed NE is greater than or equal to a set engine speed NEUPER.

If each of steps S108, S109, and S110 is passed (i.e., if the fuel has not been cut, Tp≧TpLWER, and NE<NEUPER), a step S111 acts as a diagnosis condition true step that sets a diagnosis authorization flag FLGDIAG (FLGDIAG=1). On the other hand, if step S108 detects that fuel has been cut, or step S109 detects that Tp<TpLWER, or step S110 detects that NE≧NEUPER, each of these steps branches to a step S112 which is a diagnosis condition false step that clears the diagnosis authorization flag FLGDIAG (i.e., FLGDIAG←0).

Then the flow proceeds from either step S111 or S112 to a step S113 in which the previously mentioned continuous misfire diagnosis subroutine is executed, to detect the start and end of continuously generated misfiring. In a step S114 (shown in FIG. 3), the value of a misfire flag FLGMISn-1 for the previous combustion stroke cylinder, cylinder n-1, is referenced.

If misfiring has been identified by the misfire diagnosis of step S113, this misfire flag FLGMISn-1 is already set to 1. If it is cleared to 0, meaning that misfiring was not generated in cylinder n-1, the flow proceeds from step S114 to a step S115 which checks whether the difference Δ between the differential rotation DELNEn-1 for cylinder n-1 and the weighted mean differential rotation AVEDNO for all cylinders up until the previous execution (i.e., Δ←DELNEn-1−AVEDNO) lies within a prescribed range set by minimum (MINDN) and maximum (MAXDN) values (i.e., MINDN<Δ<MAXDN).

If step S115 determines that Δ does lie within this set range, the flow proceeds to steps S119 and S120 which identify that the differential rotation DELNEn is varying due to an error relating to the crank rotor 31 or the crank angle sensor 32, for statistical processing of the differential rotation DELNEn-1, then to a step S121.

In other words, to compensate for fluctuations in differential rotation due to such an error, step S119 calculates a new weighted mean differential rotation AVEDN for all cylinders from the previous weighted mean differential rotation AVEDNO for all cylinders up until the previous execution and the compensated differential rotation DELNAn-1 for cylinder n-1 (i.e., AVEDN←($\frac{7}{8}$×AVEDNO)+($\frac{1}{8}$×DELNAn-1)). Step S120 calculates a new differential rotation compensation value AVEDNOn-1 for cylinder n-1 from the difference between this new weighted mean differential rotation AVEDN and the differential rotation DELNEn-1 for cylinder n-1, and a differential rotation compensation value AVEDNn-1 for cylinder n-1 up until the previous execution (i.e., AVEDNn-1←($\frac{7}{8}$×AVEDNOn-1)+($\frac{1}{8}$×(DELNEn-1−AVEDN)).

On the other hand, if step S114 determines that FLGMISn-1=1, meaning that misfiring occurred in cylinder n-1, a step S116 increments a count of misfires MISCNTn-1 by 1 (i.e., MISCNTn-1←MISCNTn-1+1), then flow proceeds to a step S117.

If step S115 determines that Δ≧MINDN or Δ≧MAXDN, this indicates that the fluctuation in the differential rotation DELNEn-1 is not due to an error relating to the crank rotor 31 or the crank angle sensor 32—the fluctuation in the differential rotation DELNEn-1 is due to another factor (such as snatch, acceleration, or deceleration). And the flow proceeds from the step S115 to the step S117.

A step S117 then takes the weighted mean differential rotation AVEDNO for all cylinders up until the previous execution and makes it the weighted mean differential rotation AVEDN for all cylinders up until the current execution (i.e., AVEDN←AVEDNO), and a step S118 takes a differential rotation compensation value AVEDNOn-1 for cylinder n-1 up until the previous execution and makes it a new differential rotation compensation value AVEDNn-1 for cylinder n-1 (i.e., AVEDNn-1←AVEDNOn-1). The flow moves on to step S121.

When the flow proceeds from step S118 to step S120 to step S121, the diagnosis authorization flag FLGDIAG is referenced. If FLGDIAG=0, the flow jumps to a step S127; if FLGDIAG=1, the flow proceeds to a step S122 which increments a count CRACNT that totals the misfire diagnosis executions (i.e., CRACNT←CRACNT+1) then to a step S123 which checks whether or not this count CRACNT has exceeded 2000.

Note that, since the misfire routine described above is executed at each input of the θ3 crank angle, in other words at every half-rotation of the engine, a CRACNT value of 2000 indicates 1000 engine revolutions.

If step S123 determines that CRACNT<2000, the flow branches to step S127; if it determines that CRACNT≧2000, it proceeds to a step S124 in which a misfire identification subroutine that is described below is executed. In a step S125, the count CRACNT is cleared to 0, in a step S126, a count MISCNT1-4 of misfires of all cylinders is cleared to 0 (i.e., CRACNT←0, MISCNT1-4←0), then the flow proceeds to step S127 which loads into the RAM 44 some parameters such as the differential rotation DELNEn calculated up until the current execution, the compensated differential rotation DELNAn, the weighted mean differential rotation AVEDN for all cylinders, and the differential rotation compensation value AVEDNn-1 for cylinder n-1, to act as data for monitoring, then returns from the routine.

The continuous misfire diagnosis of step S113 in the misfire diagnosis routine and the misfire identification subroutine of step S124 will now be described.

First, a step S201 of the continuous misfire diagnosis subroutine shown in FIG. 1 references the value of the diagnosis authorization flag FLGDIAG. If FLGDIAG=0, the flow proceeds to a step S211 which clears the misfire flag FLGMISn-1 for the previous combustion stroke cylinder, cylinder n-1, (i.e., FLGMISn-1←0) then returns from the routine. If FLGDIAG=1, the flow proceeds to a step S202.

Step S202 references an interpolated misfire identification level map, using the engine speed NE and the basic fuel injection pulse width Tp as parameters, to set the misfire identification level LVLMIS, and the flow proceeds to a step S203 onward.

The misfire identification level LVLMIS is stored in the ROM 43 as a map of rising slice levels at which the basic fuel injection pulse width Tp increases as the load increases, from a diagnosis-impossible region which is a low engine load region in which the basic fuel injection pulse width Tp is small, as shown in FIG. 12.

Next, as the flow proceeds from step S202 to step S203, a negative value of the misfire identification level LVLMIS (obtained by inverting the sign for the identification) is compared with the compensated differential rotation DELNAn-1 for cylinder n-1. If DELNAn-1>-LVLMIS, meaning that the compensated differential rotation DELNAn-1 for cylinder n-1 has not fallen below the negative misfire identification level -LVLMIS, the decision is such that misfire has not occurred, flow branches to the previously described step S211, the misfire flag is cleared, and the flow returns from the routine.

On the other hand, if the result of the comparison in step S203 is DELNAn-1≧-LVLMIS, meaning that the compensated differential rotation DELNAn-1 for cylinder n-1 has fallen to less than or equal to the negative misfire identification level -LVLMIS, the flow proceeds from step S203 to a step S204 which compares the compensated differential rotation change DDNEAn for cylinder n with the negative misfire identification level -LVLMIS, to check for changes in the compensated differential rotation DELNA in the transition from cylinder n-1 to cylinder n.

If step S204 determines that DDNEAn≧-LVLMIS, in other words when this step checks whether or not the compensated differential rotation DELNA is gradually dropping in the transition from cylinder n-1 to cylinder n and it finds that it is rapidly dropping instead, it determines that the rotation fluctuations are due to a factor other than misfiring, and returns via step S211. If DDNEAn>-LVLMIS, meaning that the compensated differential rotation DELNA that has dropped below the negative misfire identification level -LVLMIS is fluctuating in the vicinity of the negative misfire identification level -LVLMIS in the transition from cylinder n-1 to cylinder n, a step S205 compares the compensated differential rotation change DDNEAn-1 for cylinder n-1 with the negative misfire identification level -LVLMIS to check changes in the compensated differential rotation DELNA in the transition from cylinder n-2 to cylinder n-1.

As a result, if step S205 determines that DDNEAn-1 ≦-LVLMIS, in line with the results from the comparisons of steps S203 and S204, this means that the compensated differential rotation DELNA has fallen to less than or equal to the negative misfire identification level -LVLMIS in the transition from cylinder n-2 to cylinder n-1, and thus, when it is in the vicinity of the negative misfire identification level -LVLMIS even during the transition from cylinder n-1 to cylinder n, the routine determines that misfiring has started from cylinder n-1 and the flow proceeds from step S205 to a step S208.

Step S208 sets the compensated differential rotation DELNAn-1 for cylinder n-1 as a minimum value DNEAMS (i.e., DNEAMS +DELNAn-1), a step S210 then sets the misfire flag FLGMISn-1 for cylinder n-1 (i.e., FLGMISn-1 ←1), and returns from the routine.

On the other hand, if step S205 determines that DDNEAn-1>-LVLMIS, meaning that the compensated differential rotation DELNA has not fallen to below the negative misfire identification level -LVLMIS in the transition from cylinder n-2 to cylinder n-1, the flow branches from step S205 to a step S206 which determines whether or not the misfire flag FLGMISn-2 for cylinder n-2 has been set, in other words, whether or not misfiring occurred in cylinder n-2.

If step S206 determines that FLGMISn-2=0, meaning that misfiring did not occur in cylinder n-2, the flow returns via step S211 described above. If FLGMISn-2=1, meaning that misfiring occurred in cylinder n-2, the flow proceeds from step S206 to a step S207 which checks the drop level of the compensated differential rotation DELNAn-1 for cylinder n-1.

In other words, step S207 compares the compensated differential rotation DELNAn-1 for cylinder n-1 with the minimum value DNEAMS. If DELNAn-1<DNEAMS, meaning that the compensated differential rotation DELNAn-1 for cylinder n-1 has fallen below the minimum value DNEAMS for differential rotation during misfiring, this step determines that misfiring has continued to be generated in the transition from cylinder n-2 to cylinder n-1, the flow branches to step S208 which updates the minimum value DNEAMS, to step S210 which sets the misfire flag FLGMISn-1, then returns from the routine.

On the other hand, if step S207 determines that DELNAn-1≧DNEAMS, meaning that the compensated differential rotation DELNAn-1 for cylinder n-1 is greater than or equal to the minimum value DNEAMS, the flow proceeds from step S207 to a step S209 which compares the compensated differential rotation DELNAn-1 for cylinder n-1 with the sum of the misfire identification level LVLMIS and the minimum value DNEAMS, to determine whether or not the fall of the compensated differential rotation DELNA has recovered to the prescribed level.

If step S209 determines that DELNAn-1<DNEAMS+LVLMIS, meaning that the fall of the compensated differential rotation DELNAn-1 for cylinder n-1 has not recovered, it determines that misfiring in cylinder n-1 is continuous, and the flow goes to step S210 which sets the misfire flag FLGMISn-1 then returns from the routine.

If, on the other hand, step S209 determines that DELNAn-1≧DNEAMS+LVLMIS, meaning that the fall of the compensated differential rotation DELNAn-1 for cylinder n,1 has recovered, it determines that misfiring has ended, and the flow proceeds to step S211 which clears the misfire flag FLGMISn-1, then returns from the routine.

In other words, if the compensated differential rotation DELNA has fallen in the negative direction to less than or equal to the misfire identification level LVLMIS in the transition from cylinder n-2 to cylinder n-1, and that status has continued during the transition from cylinder n-1 to cylinder n, the routine determines that misfiring has started from cylinder n-1. After misfiring generation has been identified, this method can accurately detect misfiring that has occurred continuously in two cylinders in sequence, such as cylinders 1 and 3, as shown in FIG. 13, by determining that misfiring has ended when the compensated differential rotation DELNAn has recovered to greater than or equal to a prescribed level.

Next, as shown in FIG. 4, a step S301 of the misfire identification subroutine divides a total misfire count ΣMISCNTn (where n=1 to 4) by the count CRACNT (=2000, equivalent to 1000 revs) from the misfire diagnosis routine, and calculates the misfire ratio MISCNT (%) for 1000 revs of the engine (i.e., MISCNT←Σ-MISCNTn/CRACNT ×100).

The flow then proceeds to a step S302 which determines whether or not the misfire ratio MISCNT calculated in step S301 is less than a set value LMSCNT. This set value LMSCNT is a constant that has previously been stored in the RAM 44 as a parameter of the engine speed NE and the basic fuel injection pulse width Tp.

If the result of the determination of step S3021 is MISCNT≧LMSCNT, a step S303 stores the misfire ratio MISCNT at a prescribed address in the backup RAM 44a, and a step S304 checks whether or not a first misfire identification error flag FLGNG1 is set.

If step S304 determines that the first misfire identification error flag FLGNG1 has not been set, meaning that FLGNG1=0, the flow jumps from step S304 to a step S306. If the first misfire identification error flag FLGNG1 has been set, the flow proceeds from step S304 to a step S305 which sets a second misfire identification error flag FLGNG2 stored at a prescribed address in the backup RAM 44a (i.e., FLGNG2←1), issues a warning to the user by some means such as lighting or flashing the ECS indicator 53, then goes to a step S306.

Step S306 sets the first misfire identification error flag FLGNG1 (i.e., FLGNG1←1), a step S312 clears a misfire OK counter (i.e., CNTOK←0) that counts the number of no-abnormality decisions, then returns from the routine.

In other words, in order to avoid erroneous diagnosis due to factors such as noise, a warning is not issued immediately, even if the first determination decides that the misfire ratio MISCNT is greater than or equal to the set value LMSCNT. However, if the second determination decides that MISCNT continues to be greater than or equal to the set value LMSCNT, a warning is issued to indicate that there is an abnormality in that cylinder.

Note that in this case, error data on a cylinder that is misfiring is stored in the backup RAM 44a, so that when a dealer comes to troubleshoot the engine, the error data recorded in the backup RAM 44a can be read out therefrom as flashing codes of ECU 41 monitor indicators, or displayed on a serial monitor 54. After the misfiring cylinder has been identified and repaired, the error data in the backup RAM 44a can also be cleared from this serial monitor 54.

On the other hand, if step S302 determines that MISCNT<LMSCNT, meaning that there is no abnormality, a step S307 increments the misfire OK counter CNTOK (i.e., CNTOK←CNTOK+1), then a step S308 checks whether or not the value of the misfire OK counter CNTOK has exceeded 80. If CNTOK<80, the routine returns at that point. If CNTOK≧80, steps S309, S310, and S311 in turn clear the first misfire identification error flag FLGNG1, the second misfire identification error flag FLGNG2, and the misfire ratio MISCNT (i.e., FLGNG1←0, FLGNG2←0, MISCNTa0), then step S312 clears the misfire OK counter CNTOK (i.e., CNTOK←0) and flow returns from the routine.

In accordance with the present invention described above, a continuous misfiring status is identified as being a period after a difference in engine speed between the two cylinders that are consecutive in the combustion sequence has changed beyond the width of a misfire identification level and has fallen below a negative value that is less than the misfire identification level, until it rises to a prescribed level. Therefore, this method can distinguish between continuous misfiring and continuous fluctuations in engine speed generated by factors other than misfiring, can thus provide superlative results such as enabling the accurate detection of misfiring.

The following explains another method of detecting misfire in an engine with references to FIGS. 14–17.

Figure 14:
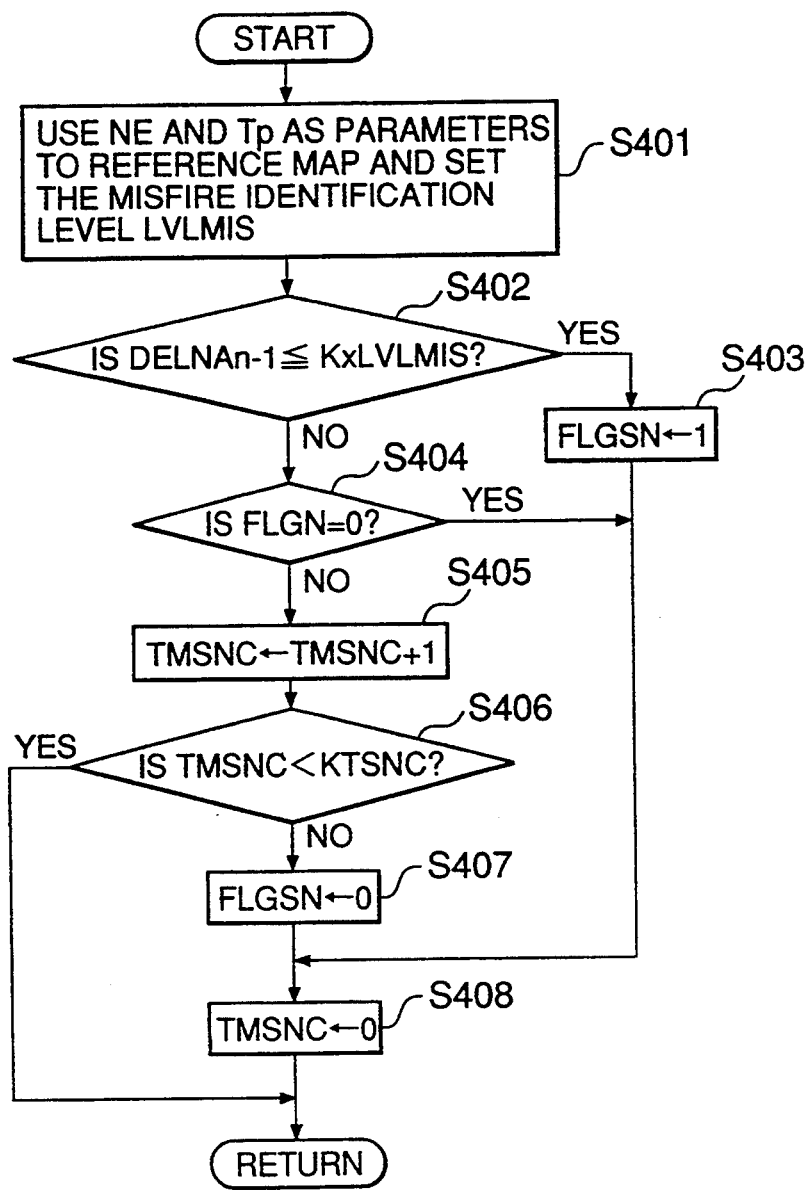
FIG. 14 is a flowchart of a snatch identification diagnosis subroutine.
Figure 15:
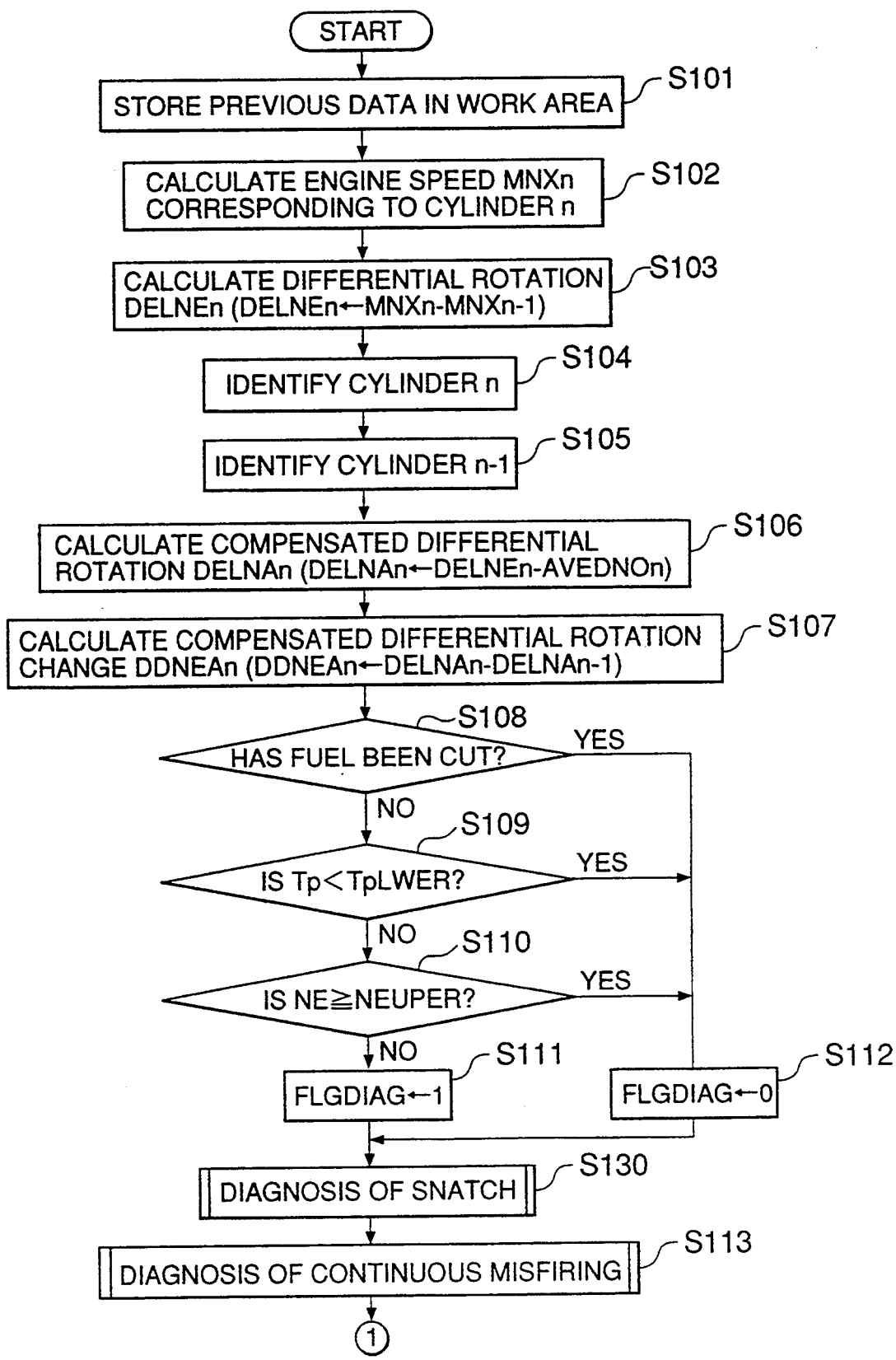
FIG. 15 is the first part of a flowchart of a misfire diagnosis routine.

First, a step S401 of the snatch identification subroutine shown in FIG. 14 references an interpolated misfire identification level map, using the engine speed NE and the basic fuel injection pulse width Tp as parameters, to set the misfire identification level LVLMIS based on the engine's operating status.

The misfire identification level LVLMIS is stored in the ROM 43 as a map of rising slice levels at which the basic fuel injection pulse width Tp increases as the load increases, from a diagnosis-impossible region which is a low engine load region in which the basic fuel injection pulse width Tp is small, as shown in FIG. 12.

Next, in order to identify the presence of a phenomenon called snatch (a fluctuation in engine rotation due to torque changes caused by an external disturbance such as sudden acceleration or abrupt speed changes), the flow proceeds from step S401 to a step S402 which takes an identification level (hereinafter called a snatch identification level) obtained by multiplying the misfire identification level LVLMIS by a factor K (where K depends on the engine characteristics, but is normally between 1 and 2) and compares it with the compensated differential rotation DELNAn-1 for cylinder n-1. If DELNAn-1≧K×-LVLMIS, the decision is such that the snatch phenomenon, a large fluctuation in engine rotation caused by an external disturbance, has occurred and the flow branches to a step S403 which sets a snatch flag FLGSN (FLGSN←1) then to a step S408 which clears a count TMSNC which will be described below (TMSNC←0), and returns from the subroutine.

On the other hand, if DELNAn-1<K×-LVLMIS, the flow proceeds from step S402 to a step S404 which determines whether or not the snatch flag FLGSN has been cleared. If FLGSN=0, the flow returns from the subroutine via the step S408 described above. If FLGSN =1, meaning that the previous execution of this subroutine had determined that DELNAn-1≧K×-LVLMIS and had set the snatch flag FLGSN, when step S402 has determined that DELNAn-1<K×-LVLMIS, the flow proceeds from step S404 to a step S405 which increments the count TMSNC (TMSNC←TMSNC+1) within a subsequent prescribed time, then returns from the subroutine.

The count TMSNC is started when the compensated differential rotation DELNAn-1 for cylinder n-1 temporarily rises to greater than or equal to the snatch identification level (K×-LVLMIS) and has subsequently become less than the snatch identification level (K×-LVLMIS), and is used to time a period of time thereafter. Step S405 increments the count TMSNC and then a step S406 determines whether or not the count TMSNC has exceeded a set value (number of ignitions) KTSNC.

By finding that the set value KTSNC, which could, for example, be calculated from the engine speed NE (KTSNC=NE/100) satisfies the relationship TMSNC<KTSNC, meaning that the compensated differential rotation DELNAn-1 for cylinder n-1 has intersected the snatch identification level (K×-LVLMIS) from above, step S406 determines that the specified time indicated by the set value KTSNC has not elapsed, and returns without doing anything from the subroutine.

On the other hand, if step S406 finds that TMSNC≧KTSNC, meaning that the compensated differential rotation DELNAn-1 for cylinder n-1 has intersected the snatch identification level (K×-LVLMIS) and the specified time indicated by the set value KTSNC has elapsed, it determines that snatch (a fluctuation in engine rotation due to external disturbance) has ended and the flow proceeds to a step S407 which clears the snatch flag FLGSN (FLGSN←0), then to step S408 which clears the count TMSNC, then returns from the subroutine.

Figure 16:
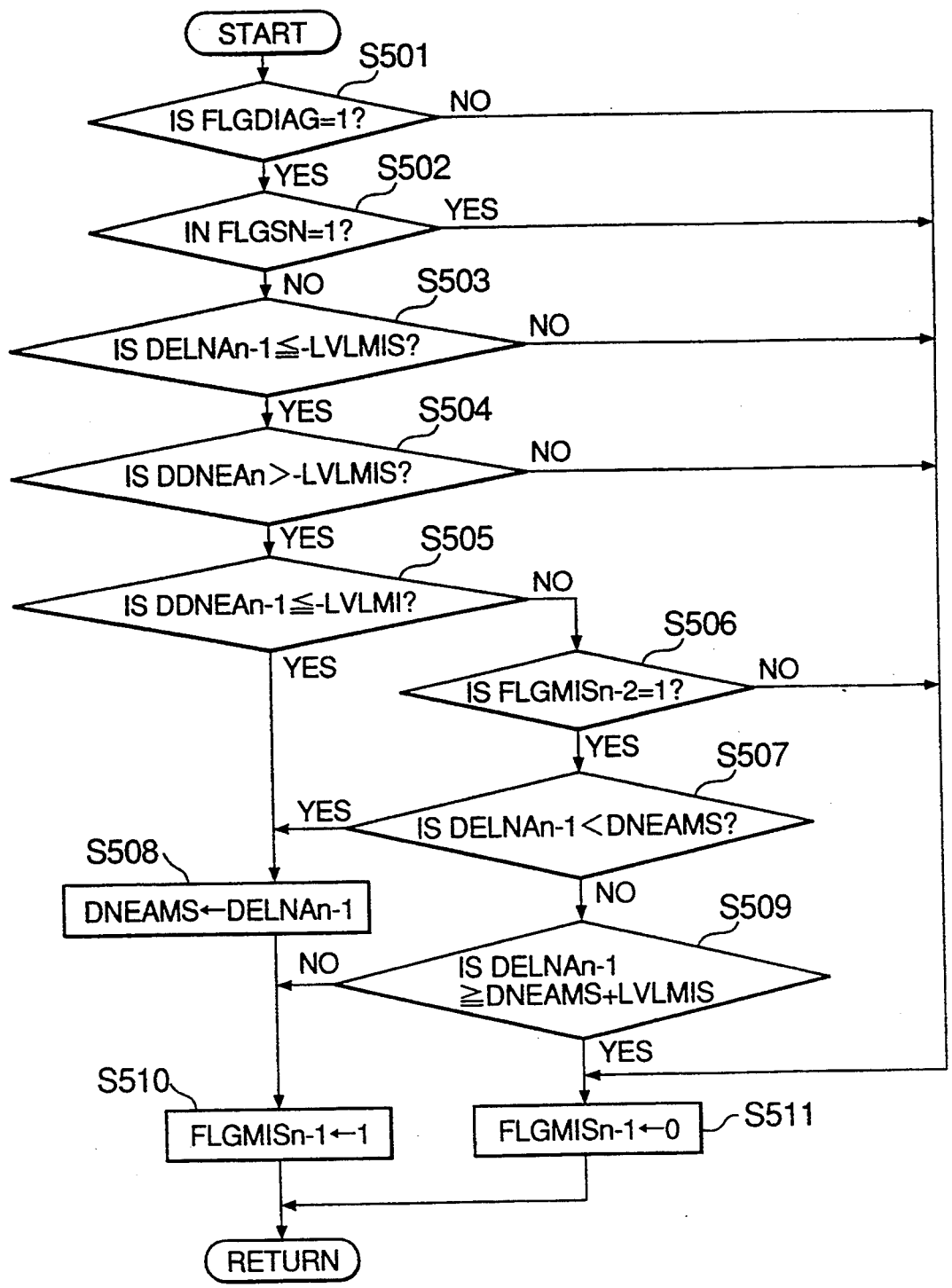
FIG. 16 is a flowchart of a continuous misfire diagnosis subroutine.

The value of the snatch flag FLGSN is referenced in a continuous misfire identification subroutine shown in FIG. 16. A step S501 of this subroutine references the diagnosis authorization flag FLGDIAG. If FLGDIAG=0, a step S511 clears the misfire flag FLGMISn-1 for cylinder n-1 (FLGMISn-1←0); if FLGDIAG=1, a step S502 references the snatch flag FLGSN.

Figure 17:
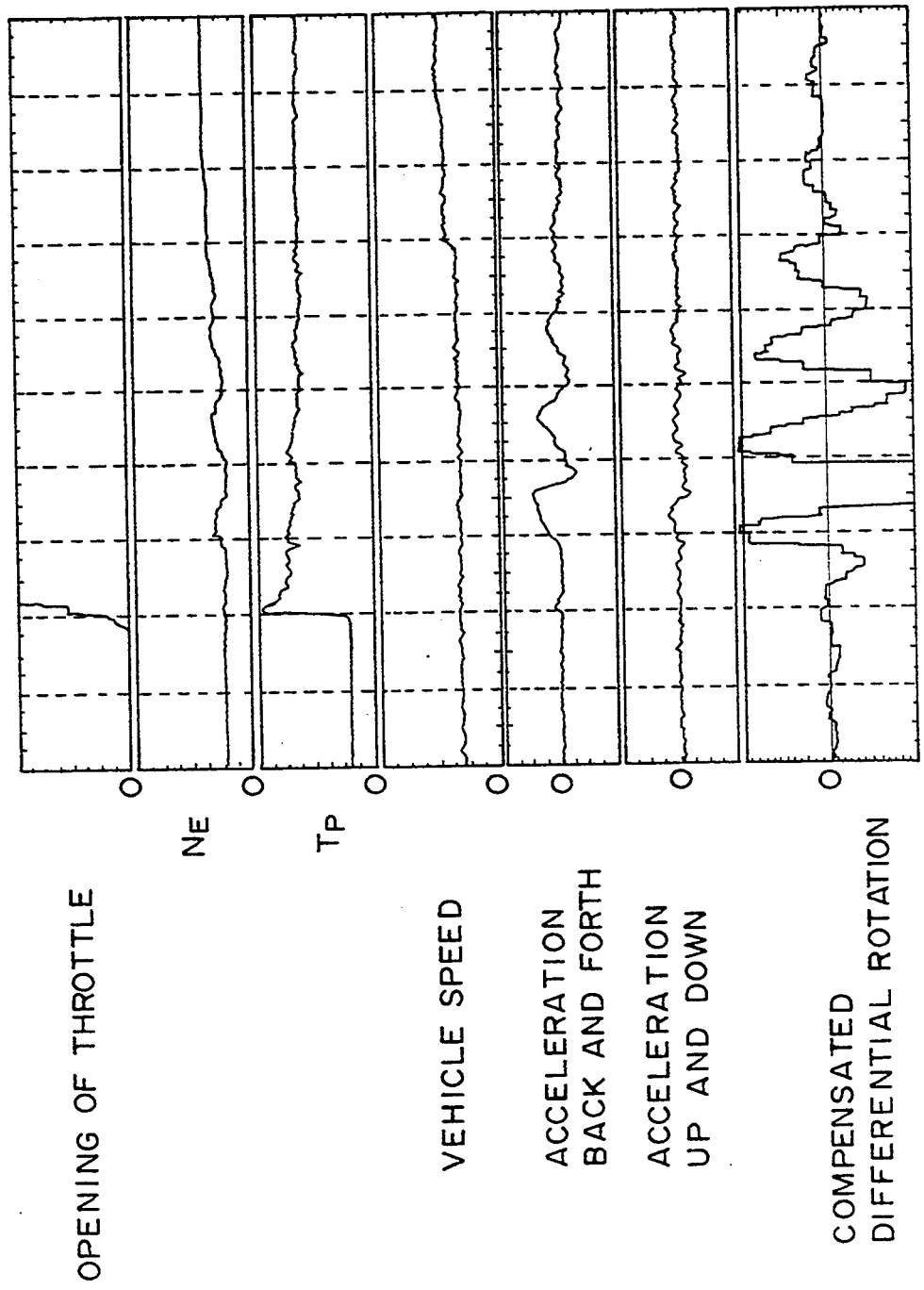
FIG. 17 is a timing chart showing various fluctuations in an engine.

If step S502 determines that FLGSN=1, the flow returns from the subroutine through step S511 without going on to determine whether on not misfiring is occurring, because a fluctuation in engine rotation due to an external disturbance (snatch) has occurred. In other words, as shown in FIG. 17, if the opening of the throttle is violently increased by something such as a sudden acceleration, the fuel injection quantity (the basic fuel injection pulse width Tp) is immediately increased in accordance thereby, and the engine speed NE and vehicle speed rise later. During this time, the differences in engine speed between cylinders will vary widely, and the snatch phenomenon which greatly varies the acceleration at about that time is generated, which is why identification for misfire is halted, and thus erroneous identification is prevented, during the rotational fluctuations due to this snatch.

On the other hand, if step S502 finds that FLGSN=0, rotational fluctuations due to snatch have settled down, so the flow proceeds from step S502 to a step S503 onwards, to execute a continuous misfire identification. In this continuous misfire identification, step S503 first compares the negative misfire determination level -LVLMIS with the differential rotation DELNEn-1 for cylinder n-1.

If the result of the comparison in S503 is DELNEn-1 >-LVLMIS, meaning that the differential rotation DELNEn-1 for cylinder n-1 has not fallen to less than or equal to the negative misfire determination level -LVLMIS, it determines that misfiring is not occurring and branches to step S311 which clears the misfire flag FLGMISn-1 (FLGMISn-1←0) and returns from the subroutine.

If the result of the comparison in S503 is DELNEn-1 ≦-LVLMIS, meaning that the differential rotation DELNEn-1 for cylinder n-1 has fallen to less than or equal to the negative misfire determination level -LVLMIS, the flow proceeds from step S503 to a step S504 which compares the compensated differential rotation DELNAn for cylinder n with the negative misfire determination level -LVLMIS, to check for a change in the compensated differential rotation DELNAn in the compensated differential rotation DELNA in the transition from cylinder n-1 to cylinder n.

If step S504 determines that DDNEAn≦-LVLMIS, meaning that the compensated differential rotation DELNA has dropped in stages in the transition from cylinder n-1 to cylinder n, it determines that the rotation fluctuations are due to a factor other than misfiring, and returns via step S511. If DDNEAn >-LVLMIS, meaning that the compensated differential rotation DELNA that had dropped to less than or equal to the negative misfire determination level -LVLMIS has changed to close to the negative misfire determination level -LVLMIS, a step S505 compares the compensated differential rotation DELNAn-1 for cylinder n-1 with the negative misfire determination level -LVLMIS, to check for a change in the compensated differential rotation DELNA in the transition from cylinder n-2 to cylinder n-1.

As a result, if step S505 determines that DDNEAn-1 ≦-LVLMIS, in line with the results from the comparisons of steps S503 and S504, this means that the compensated differential rotation DELNA has fallen to less than or equal to the negative misfire identification level -LVLMIS in the transition from cylinder n-2 to cylinder n-1, and has remained in the vicinity of the negative misfire identification level -LVLMIS even during the transition from cylinder n-1 to cylinder n, the subroutine determines that misfiring has started from cylinder n-1 and the flow proceeds from step S505 to a step S508.

Step S508 sets the compensated differential rotation DELNAn-1 for cylinder n-1 as a minimum value DNEAMS (i.e., DNEAMS←DELNAn-1), a step S510 then sets the misfire flag FLGMISn-1 for cylinder n-1 (i.e., FLGMISn-1 ←1), and the flow returns from the subroutine.

On the other hand, if step S505 determines that DDNEAn-1>-LVLMIS, meaning that the compensated differential rotation DELNA has not fallen to less than or equal to the negative misfire identification level -LVLMIS in the transition from cylinder n-2 to cylinder n-1, the flow branches from step S505 to a step S506 which determines whether or not the misfire flag FLGMISn-2 for cylinder n-2 has been set, in other words, whether or not misfiring occurred in cylinder n-2.

If step S506 determines that FLGMISn-2=0, meaning that misfiring did not occur in cylinder n-2, the flow returns via step S511 described above. If FLGMISn-2 =1, meaning that misfiring occurred in cylinder n-2, the flow proceeds from step S506 to a step S507 which checks the drop level of the compensated differential rotation DELNAn-1 for cylinder n-1.

In other words, step S507 compares the compensated differential rotation DELNAn-1 for cylinder n-1 with the minimum value DNEAMS. If DELNAn-1<DNEAMS, meaning that the compensated differential rotation DELNAn-1 for cylinder n-1 has fallen below the minimum value DNEAMS for differential rotation during misfiring, this step determines that misfiring has continued to be generated in the transition from cylinder n-2 to cylinder n-1, the flow branches to step S508 which updates the minimum value DNEAMS, to step S510 which sets the misfire flag FLGMISn-1, then returns from the subroutine.

On the other hand, if step S507 determines that DELNAn-1≧DNEAMS, meaning that the compensated differential rotation DELNAn-1 for cylinder n-1 is greater than or equal to the minimum value DNEAMS, the flow proceeds from step S507 to a step S509 which compares the compensated differential rotation DELNAn-1 for cylinder n-1 with the sum of the misfire identification level LVLMIS and the minimum value DNEAMS, to determine whether or not the fall of the compensated differential rotation DELNA has recovered to the prescribed level.

If step S509 determines that DELNAn-1<DNEAMS+LVLMIS, meaning that the fall of the compensated differential rotation DELNAn-1 for cylinder n-1 has not recovered, it determines that misfiring in cylinder n-1 is continuous, and the flow goes to step S510 which sets the misfire flag FLGMISn-1 then returns from the subroutine.

If, on the other hand, step S509 determines that DELNAn-1≧DNEAMS+LVLMIS, meaning that the fall of the compensated differential rotation DELNAn-1 for cylinder n-1 has recovered, it determines that misfiring has ended, and the flow proceeds to step S511 which clears the misfire flag FLGMISn-1, then returns from the subroutine.

In other words, if the compensated differential rotation DELNA has fallen in the negative direction to less than or equal to the misfire identification level LVLMIS in the transition from cylinder n-2 to cylinder n-1, and that status has continued during the transition from cylinder n-1 to cylinder n, the subroutine determines that misfiring has started from cylinder n-1. After misfiring generation has been identified, this method can accurately detect misfiring that has occurred continuously in two cylinders in sequence, such as cylinders 1 and 3, as shown in FIG. 13, by determining that misfiring has ended when the compensated differential rotation DELNAn has recovered to greater than or equal to a prescribed level.

In accordance with the present invention described above, when a large fluctuation in engine rotation has been generated, as determined by a difference in engine speed between two cylinders that are consecutive in the combustion sequence rising to greater than or equal to an identification level for identifying engine rotation fluctuations due to an external disturbance, the diagnosis for misfire detection is halted. The diagnosis for misfire detection is halted until a prescribed time has expired after the difference in engine speed has intersected the identification level in the downward direction, in order to wait for the engine rotation fluctuations to settle down, so that the present invention can prevent erroneous diagnosis and can also accurately detect misfiring.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. Misfire discriminating method for an engine with a crank shaft for outputting power and a cam shaft for actuating valves having, a plurality of cylinders, a crank angle sensor for detecting a crank angle position of said crankshaft and for generating a crank angle signal, a cam angle sensor for detecting a cam angle position of said cam shaft and for producing a cam angle signal, and control means responsive to said crank angle and said cam angle for controlling an ignition timing of said engine, the method comprising:
    setting an identification level for identifying misfiring based on engine operating conditions;
    obtaining an engine speed difference between a speed of a first cylinder at a combustion stroke and a speed of a second cylinder at a combustion stroke in a consecutive combustion sequence; and
    identifying a period while said difference falls to a negative value less than said identification level and rises to a prescribed level as a continuous misfiring condition.

2. The misfire discriminating method in accordance with claim 1, wherein
    said engine speed difference is corrected by a difference correction value calculated by statistical processing of differences in engine speed based on a previous calculation with respect to said difference in engine speed between said first and second cylinders at combustion stroke, said two cylinders are in a consecutive combustion sequence.

3. The misfire discriminating method in accordance with claim 2, wherein
said engine speed difference is corrected by said difference correction value when there is a sudden change in said difference in engine speed between said first and second cylinders at the combustion stroke.

4. The method in accordance with claim 1, wherein said engine misfire detection is performed whenever at least one of the following steps is performed:
detecting whether fuel has been cut or not;
checking whether a basic fuel injection pulse width becomes less than a prescribed value or not;
checking whether the engine speed is less than a prescribed value or not.

5. The method in accordance with claim 1, wherein said difference in engine speed is corrected by a difference correction value calculated by statistical processing of differences in engine speed relating to all cylinders.

6. The method in accordance with claim 1, wherein said misfire detection is performed when said basic fuel injection pulse width for said fuel injection becomes less than said prescribed value.

7. The method in accordance with claim 6, wherein said prescribed value increases in accordance with the increase of said difference in engine speed.

8. The method in accordance with claim 1, further comprising:
obtaining a number of misfires in said plurality of cylinders of said engine divided by a prescribed number of engine revolutions;
determining whether said misfire ratio is larger than a prescribed value or not;
said prescribed value being obtained by using said engine speed and a basic fuel injection pulse width; and
determining said misfire condition when said misfire ratio is larger than said prescribed value.

9. The method in accordance with claim 8, wherein said prescribed value is obtained by using said engine speed and said basic fuel injection pulse width as parameters.

10. The method in accordance with claim 8, further comprising the steps of:
producing a warning when said misfire ratio larger than said prescribed ratio occurs two times.

11. A misfire identification method for an engine with a crankshaft for outputting power and a camshaft for actuating valves, having a crank plate connected to said crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle and said cam angle for controlling an ignition timing of said engine, an improvement of the method which comprises the steps of:
detecting a difference in engine speed between two cylinders whose combustion strokes are consecutive in a combustion sequence;
setting an identification level for identifying a fluctuation in engine rotation due to an external disturbance, based on the engine's operating status; and
halting misfiring detection until a prescribed period of time expires after said difference in engine speed has risen to greater than said identification level and said difference in engine speed intersect said identification level in the downward direction.

12. Misfire discriminating method for an engine having, a crankshaft rotated by a reciprocating piston in a plurality of cylinders for outputting power, a camshaft provided in parallel with said crankshaft for actuating a valve, a crank plate with a plurality of first protrusions on a periphery thereof connected to an end of said crankshaft for indicating a crank angle position, a cam plate with a plurality of second protrusions on a periphery thereof connected to an end of said cam shaft for indicating a cam angle position, a crank angle sensor provided near said crank plate for detecting said crank angle position and for generating a crank angle signal, a cam angle sensor adjacent to said cam plate for sensing said cam angle position and for generating a cam angle signal, and control means responsive to said crank angle signal and said cam angle signal for calculating an engine speed and for discriminating a cylinder number at a combustion stroke, the method comprising:
obtaining an engine speed difference between said engine speed of a present cylinder at said combustion stroke and said engine speed of a previous cylinder at said combustion stroke in a consecutive combustion sequence;
calculating a compensated differential rotation by subtracting a weighted mean differential rotation value from said engine speed difference;
computing a compensated differential rotation change by subtracting said compensated differential rotation at a previous combustion stroke from said compensated differential rotation at a present combustion stroke;
setting an identification level of a misfire in accordance with engine operating conditions;
identifying a period of continuous misfires of a Specific cylinder when said compensated differential rotation change goes down below a minus value of said identification level and then rises to a predetermined level;
deriving a misfire ratio by dividing a number of said periods by a predetermined number; and
determining a misfire condition when said misfire ratio is larger than a predetermined value so as to eliminate irregular rotational fluctuations due to other external disturbances and to accurately detect said misfire condition.

* * * * *